(12) United States Patent
White

(10) Patent No.: US 10,419,571 B2
(45) Date of Patent: Sep. 17, 2019

(54) PACKET PROCESSOR FORWARDING DATABASE CACHE

(71) Applicant: CAVIUM, INC., San Jose, CA (US)

(72) Inventor: Martin Leslie White, Sunnyvale, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

(21) Appl. No.: 14/667,488

(22) Filed: Mar. 24, 2015

(65) Prior Publication Data

US 2016/0285990 A1 Sep. 29, 2016

(51) Int. Cl.
*H04L 29/08* (2006.01)
*G06F 16/2455* (2019.01)

(52) U.S. Cl.
CPC ...... *H04L 67/2842* (2013.01); *G06F 16/2455* (2019.01)

(58) Field of Classification Search
None
See application file for complete search history.

(56) References Cited

U.S. PATENT DOCUMENTS

| | | | |
|---|---|---|---|
| 6,831,917 B1 | 12/2004 | Cheriton | |
| 7,263,099 B1 | 8/2007 | Woo et al. | |
| 7,292,573 B2 | 11/2007 | La Vigne | |
| 7,440,573 B2 | 10/2008 | Lor et al. | |
| 7,724,760 B2 | 5/2010 | Balakrishnan et al. | |
| 7,779,071 B2 | 8/2010 | Lor et al. | |
| 7,796,627 B2 | 9/2010 | Hurley et al. | |
| 8,054,744 B1 | 11/2011 | Bishara et al. | |
| 8,208,418 B1 | 6/2012 | Grosser, Jr. et al. | |
| 8,432,908 B2 | 4/2013 | Li | |
| 8,599,850 B2 | 12/2013 | Jha | |
| 8,787,373 B2 | 7/2014 | Cors et al. | |
| 8,964,742 B1 | 2/2015 | Mizrahi et al. | |
| 9,226,308 B2 | 12/2015 | Ketchum et al. | |
| 9,241,304 B2 | 1/2016 | Dawson et al. | |
| 9,253,043 B2 | 2/2016 | Adolphson | |
| 9,331,929 B1 | 5/2016 | Thomas et al. | |
| 9,565,136 B2 | 2/2017 | Schmidt | |
| 9,582,440 B2 | 2/2017 | Gabbay et al. | |
| 9,590,914 B2 | 3/2017 | Alizadeh Attar et al. | |
| 9,813,327 B2 | 11/2017 | Schmidt | |
| 2001/0039550 A1* | 11/2001 | Putzolu ............. | G06F 17/30575 |
| 2003/0120806 A1 | 6/2003 | Clune et al. | |

(Continued)

OTHER PUBLICATIONS

Adamchik, Binary Trees, published date Sep. 9, 2013 according to WayBack Machine, 8 pages.

(Continued)

*Primary Examiner* — Thomas J Dailey

(57) ABSTRACT

A forwarding database cache system is described herein. The forwarding database cache system includes a main forwarding database and one or more forwarding database caches. When a packet is received, the cache is searched first for information such as address information, and if found, then the packet is forwarded to the appropriate destination. If the address information is not found in the cache, then the main forwarding database is searched, and the packet is forwarded to the appropriate destination based on the information in the main forwarding database.

26 Claims, 4 Drawing Sheets

(56) References Cited

U.S. PATENT DOCUMENTS

| | | |
|---|---|---|
| 2004/0107295 A1* | 6/2004 | Herkersdorf ............ H04L 45/00 |
| | | 709/242 |
| 2005/0076228 A1 | 4/2005 | Davis |
| 2006/0045074 A1 | 3/2006 | Lee |
| 2007/0195778 A1 | 8/2007 | Tatar |
| 2008/0141023 A1 | 6/2008 | Qi |
| 2008/0279205 A1* | 11/2008 | Sgouros ................ H04L 45/745 |
| | | 370/408 |
| 2008/0304498 A1 | 12/2008 | Jorgensen |
| 2009/0028045 A1 | 1/2009 | Stellenberg et al. |
| 2010/0318538 A1* | 12/2010 | Wyman ............ G06F 17/30011 |
| | | 707/759 |
| 2012/0016845 A1* | 1/2012 | Bates .................... G06F 3/0608 |
| | | 707/692 |
| 2012/0134356 A1 | 5/2012 | Groarke et al. |
| 2013/0163475 A1 | 6/2013 | Beliveau |
| 2014/0071988 A1 | 3/2014 | Li |
| 2014/0153443 A1 | 6/2014 | Carter |
| 2014/0181374 A1* | 6/2014 | Ellard ................ G06F 12/0246 |
| | | 711/103 |
| 2014/0307579 A1* | 10/2014 | Calo .................... H04L 41/0816 |
| | | 370/254 |
| 2015/0124614 A1 | 5/2015 | Alizadeh Attar et al. |
| 2015/0124833 A1 | 5/2015 | Ma et al. |
| 2016/0014018 A1 | 1/2016 | Grosser et al. |

OTHER PUBLICATIONS

Parlante, Linked List Basics, http://cslibrary.stanford.edu/103/LinkedListBasics.pdf, 26 pages, 2001.

* cited by examiner

PACKET PROCESSOR FORWARDING DATABASE CACHE

FIELD OF INVENTION

The present invention relates to the field of networking.

BACKGROUND OF THE INVENTION

Cache is a component that transparently stores data so that future requests for that data are able to be served faster. The data that is stored within a cache might be values that have been computed earlier or duplicates of original values that are stored elsewhere. If requested data is contained in the cache (cache hit), this request is able to be served by simply reading the cache, which is comparatively faster. Otherwise (cache miss), the data has to be recomputed or fetched from its original storage location, which is comparatively slower. Hence, the greater the number of requests that can be served from the cache, the faster the overall system performance becomes.

BRIEF SUMMARY

A forwarding database cache system is described herein. The forwarding database cache system includes a main forwarding database and one or more forwarding database caches. When a packet is received, the cache is searched first for information such as address information, and if found, then the packet is forwarded to the appropriate destination. If the address information is not found in the cache, then the main forwarding database is searched, and the packet is forwarded to the appropriate destination based on the information in the main forwarding database.

In one aspect, a method comprises receiving a packet containing information, searching a cache containing a first set of searchable information for a match of the information, if the match of the information is not found in the cache, then searching a memory containing a second set of searchable information for the information and sending the packet to a destination based on the match of the information. The first set of information is stored in a first forwarding database in the cache, and the second set of information is stored in a second forwarding database in the memory. The first set of information is stored in a plurality of first forwarding databases in the cache, and the second set of information is stored in a second forwarding database in the memory. The cache and the memory are in a same physical memory. The cache and the memory are in a different physical memory. The cache includes a plurality of first physical memories and the memory is a separate physical memory. The destination includes a virtual interface or a port. The first set of searchable information within the cache contains less searchable information than the second set of searchable information within the memory, further wherein the first set of searchable information is able to retrieve searchable information from the second set of searchable information. The information comprises address information.

In another aspect, a system comprises a packet processing element configured for processing a packet including information, a main memory configured for storing searchable information to search for the information and a cache memory configured for storing a subset of the searchable information less than the entire searchable information to search for the information. The searchable information is stored in a first forwarding database in the cache and a second forwarding database in the memory. The searchable information is stored in a plurality of first forwarding databases in the cache and a second forwarding database in the memory. The cache memory and the main memory are in a same physical memory. The cache memory and the main memory are in a different physical memory. The cache memory includes a plurality of first physical memories and the main memory is a separate physical memory. Processing the packet includes forwarding the packet to a destination including a virtual interface or a port. The information comprises address information.

In yet another aspect, a device comprises a memory for storing an application, the application configured for: receiving a packet containing information, searching a cache containing a first set of searchable information for a match of the information, if the match of the information is not found in the cache, then searching a memory containing a second set of searchable information for the information and sending the packet to a destination based on the match of the information and a processing component coupled to the memory, the processing component configured for processing the application. The first set of information is stored in a first forwarding database in the cache, and the second set of information is stored in a second forwarding database in the memory. The first set of information is stored in a plurality of first forwarding databases in the cache, and the second set of information is stored in a second forwarding database in the memory. The cache and the memory are in a same physical memory. The cache and the memory are in a different physical memory. The cache includes a plurality of first physical memories and the memory is a separate physical memory. The destination includes a virtual interface or a port. The first set of searchable information within the cache contains less searchable information than the second set of searchable information within the memory, further wherein the first set of searchable information is able to retrieve searchable information from the second set of searchable information. The information comprises address information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments.

DETAILED DESCRIPTION

A forwarding database determines the proper interface to which an input interface should forward a packet. Forwarding databases are used in networking such as in bridges and routers.

Figure 1:
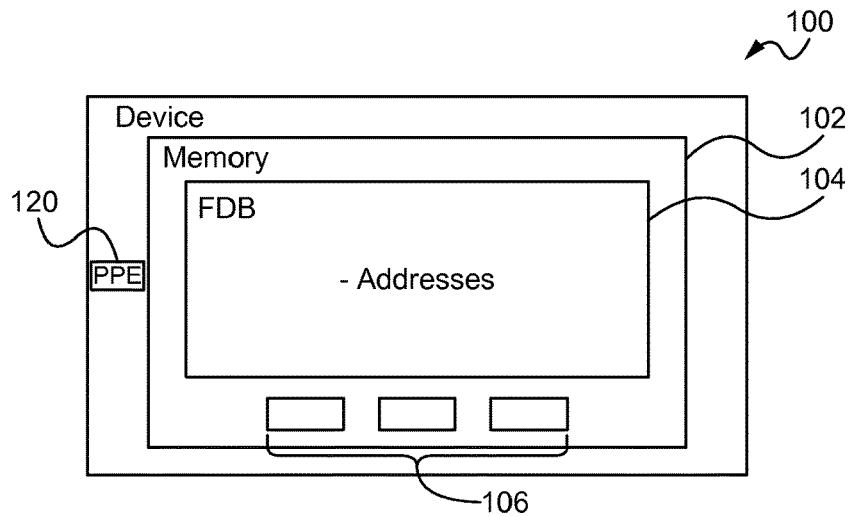
FIG. 1 illustrates a diagram of a device implementing a forwarding database cache according to some embodiments.

FIG. 1 illustrates a diagram of a device implementing a forwarding database cache according to some embodiments. The device 100 includes a memory 102 which stores a main forwarding database 104 and one or more smaller forwarding databases 106. The device 100 also includes one or more packet processing elements 120 for processing received packets including searching the main forwarding database 104 and one or more smaller forwarding databases 106 or triggering a search of the databases and sending the packets based on the search results. In some embodiments, there are multiple main forwarding databases. The main forwarding database 104 is a complete database storing all of the data (e.g., a complete set of MAC addresses), while the one or more smaller forwarding databases 106 store only portions or a subset of the data (e.g., the most recently used information or information based on any other caching scheme). The one or more smaller forwarding databases 106 are able to retrieve data from the main forwarding database 104 (e.g., after a cache miss). The data is able to be any data such as address information (e.g., MAC addresses or IPv6 addresses).

For example, the main forwarding database 104 and the one or more smaller forwarding databases 106 store address information so that after the device 100 receives packets, the device 100 is able to properly forward the packets to where they should go (e.g., port 1 or port 87) by searching the one or more smaller forwarding databases 106 or the main forwarding database 104 for the appropriate destination.

When a packet is received, the smaller forwarding databases 106 are searched first for an address, and if the address is not found, then the main forwarding database 104 is searched. After the address is found, the packet is forwarded accordingly. In some embodiments, the main forwarding database is searched at times other than a cache miss such as when the system is able to afford a slightly slower search.

Figure 2:
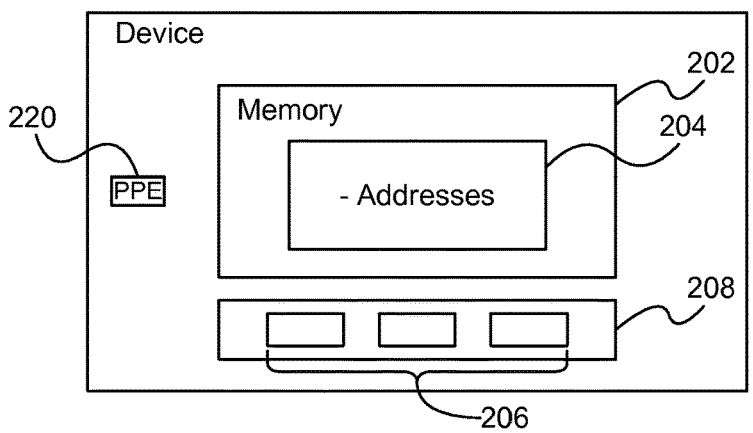
FIG. 2 illustrates a diagram of a device implementing a forwarding database cache with a main memory and a secondary memory according to some embodiments.

FIG. 2 illustrates a diagram of a device implementing a forwarding database cache with a main memory and a secondary memory according to some embodiments. The device 200 includes a main memory 202 which stores a main forwarding database 204 and a secondary memory 208 which stores one or more smaller forwarding databases 206. The device 200 also includes one or more packet processing elements 220 for processing received packets including searching the main forwarding database 204 and one or more smaller forwarding databases 206 or triggering a search of the databases and sending the packets based on the search results. In some embodiments, there are multiple main forwarding databases. The main forwarding database 204 is a complete database storing all of the data, while the one or more smaller forwarding databases 206 store only portions or a subset of the data (e.g., the most recently used information or information based on any other caching scheme). The one or more smaller forwarding databases 206 are able to retrieve data from the main forwarding database 204 (e.g., after a cache miss). The data is able to be any data such as address information (e.g., MAC addresses or IPv6 addresses).

For example, the main forwarding database 204 and the one or more smaller forwarding databases 206 store address information so that after the device 200 receives packets, the device 200 is able to properly forward the packets to where they should go (e.g., port 1 or port 87) by searching the one or more smaller forwarding databases 206 or the main forwarding database 204 for the appropriate destination.

When a packet is received, the smaller forwarding databases 206 are searched first for an address, and if the address is not found, then the main forwarding database 204 is searched. After the address is found, the packet is forwarded accordingly. In some embodiments, the main forwarding database is searched at times other than a cache miss such as when the system is able to afford a slightly slower search.

In some embodiments, the main memory 202 and the secondary memory 208 are physically separate. In some embodiments, the main memory 202 and the secondary memory 208 have different speeds (e.g., the secondary memory 208 is faster than the main memory 202).

Figure 3:
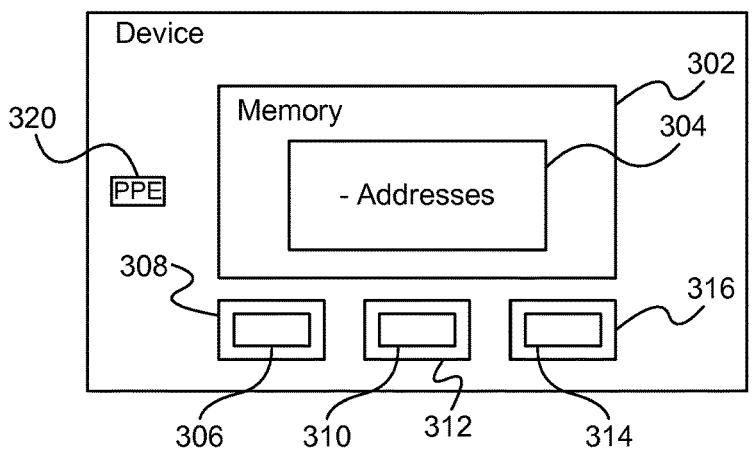
FIG. 3 illustrates a diagram of a device implementing a forwarding database cache with a main memory and multiple secondaries memory according to some embodiments.

FIG. 3 illustrates a diagram of a device implementing a forwarding database cache with a main memory and multiple secondary memories according to some embodiments. The device 300 includes a main memory 302 which stores a main forwarding database 304 and multiple secondary memories 308, 312, 316 which each store one or more smaller forwarding databases 306, 310, 314, respectively. The device 300 also includes one or more packet processing elements 320 for processing received packets including searching the main forwarding database 304 and one or more smaller forwarding databases 306, 310, 314 or triggering a search of the databases and sending the packets based on the search results. In some embodiments, there are multiple main forwarding databases. The main forwarding database 304 is a complete database storing all of the data, while the one or more smaller forwarding databases 306, 310, 314 store only portions or a subset of the data (e.g., the most recently used information or information based on any other caching scheme). The one or more smaller forwarding databases 306, 310, 314 are able to retrieve data from the main forwarding database 304 (e.g., after a cache miss). The data is able to be any data such as address information (e.g., MAC addresses or IPv6 addresses).

For example, the main forwarding database 304 and the one or more smaller forwarding databases 306, 310, 314 store address information so that after the device 300 receives packets, the device 300 is able to properly forward the packets to where they should go (e.g., port 1 or port 87) by searching the one or more smaller forwarding databases 306, 310, 314 or the main forwarding database 304 for the appropriate destination.

When a packet is received, the smaller forwarding databases 306, 310, 314 are searched first for an address, and if the address is not found, then the main forwarding database 304 is searched. After the address is found, the packet is forwarded accordingly. In some embodiments, the main forwarding database is searched at times other than a cache miss such as when the system is able to afford a slightly slower search. In some embodiments, the main memory may operate with a higher latency than the smaller databases, and still maintain the forwarding rate, although with higher latency.

In some embodiments, the main memory 302 and the multiple secondary memories 308, 312, 316 are physically separate, and in some embodiments, some of the memories are physically separate and some are together. In some embodiments, the main memory 302 and the multiple secondary memories 308, 312, 316 have different speeds (e.g., the secondary memories 308, 312, 316 are faster than the main memory 302, or the secondary memory 308 is faster than the secondary memory 312 which is faster than the secondary memory 316 which is faster than the main memory 302).

The devices of FIGS. 1, 2 and 3 are able to implement any caching scheme. In an exemplary caching scheme, when first starting (e.g., when the first packet is received), the system searches for a particular MAC address in one of the smaller forwarding databases, but the MAC address will not be found, so the main forwarding database is searched, the MAC address is found, and then the MAC address is stored in one of the smaller forwarding databases (e.g., write-through cache). In some embodiments, the information is able to be speculatively sent from the main forwarding database to one of the smaller forwarding databases. In some embodiments, if the hit is found, any speculative entry is deleted. In some embodiments, a combination of speculative reads and write-back caches are implemented. In addition, an aging element is able to be used to determine which data should be removed.

Any implementation of detecting stale entries is able to be used, as well as any type of cache (write-through, write-back, write-around) is able to be used. Any variables and implementations such as which data to be removed from the cache (e.g., least recently used), and the use of hit bits, are able to be implemented.

In some embodiments, the smaller forwarding databases operate independently of each other and/or the main forwarding database.

In some embodiments, the databases include tags or identifiers associated with the data, so that if there are conflicting tags, the caches are able to be flushed.

In some embodiments, the main forwarding database and the smaller forwarding databases are stored on the same physical memory, and in some embodiments, they are stored on separate physical memories. For example, the smaller forwarding databases are stored on a faster physical memory than the physical memory storing the main forwarding database. In some embodiments, the small forwarding databases are each stored on separate physical memories. In some embodiments, there is a larger forwarding database than the main forwarding database. Any hierarchy of databases is able to be implemented (e.g., one large database with multiple small databases, multiple large databases with multiple small databases, or a first level of databases, a second level of databases through an nth level of databases).

In some embodiments, any data structure is able to be utilized such as a database, table, or any other data structure to store information and be searched.

Figure 4:
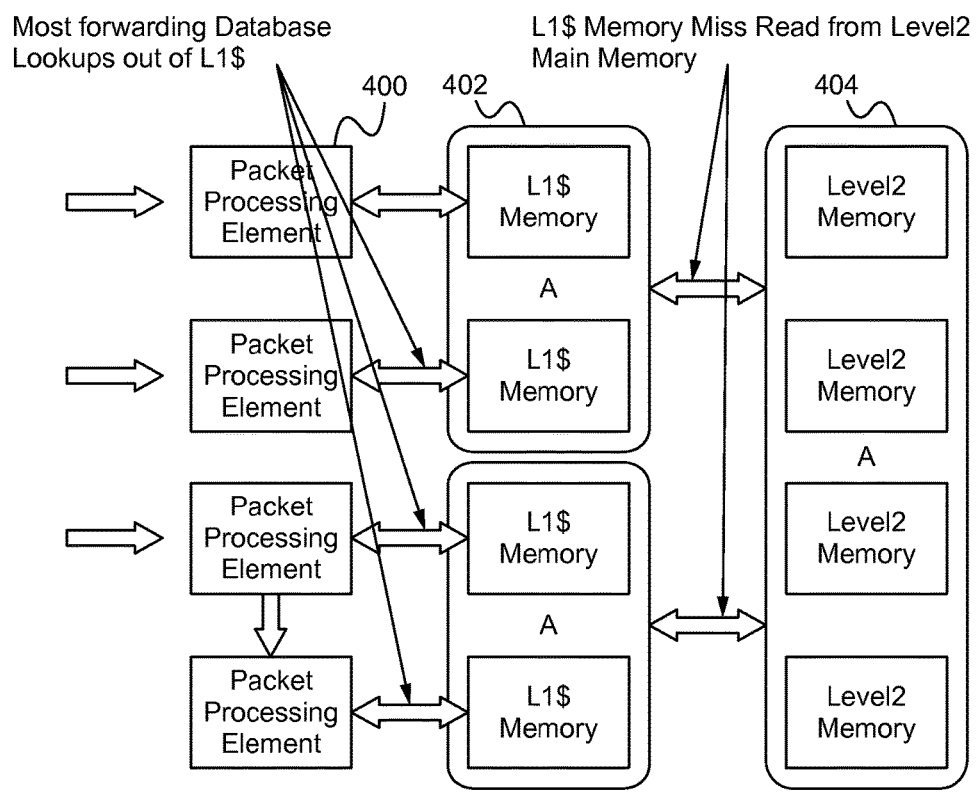
FIG. 4 illustrates a diagram of resource allocation with cache according to some embodiments.

FIG. 4 illustrates a diagram of resource allocation with cache according to some embodiments. Packets are received at packet processing elements 400, and the packet processing elements 400 search for address information in a first level cache 402. If the address is found in the first level cache 402, then the packet processing element 400 is able to forward the packet to the proper location. If the address is not found in the first level cache 402 (e.g., there is a first level cache memory miss), then the second level main memory 404 is read (or searched). Then, the packet processing element 400 forwards the packet to the proper location based on the second level main memory read. As a result of the read from second level main memory 404, the first level cache 402 is updated with new values, and other first level cache 402 memories may be either invalidated or updated.

Figure 5:
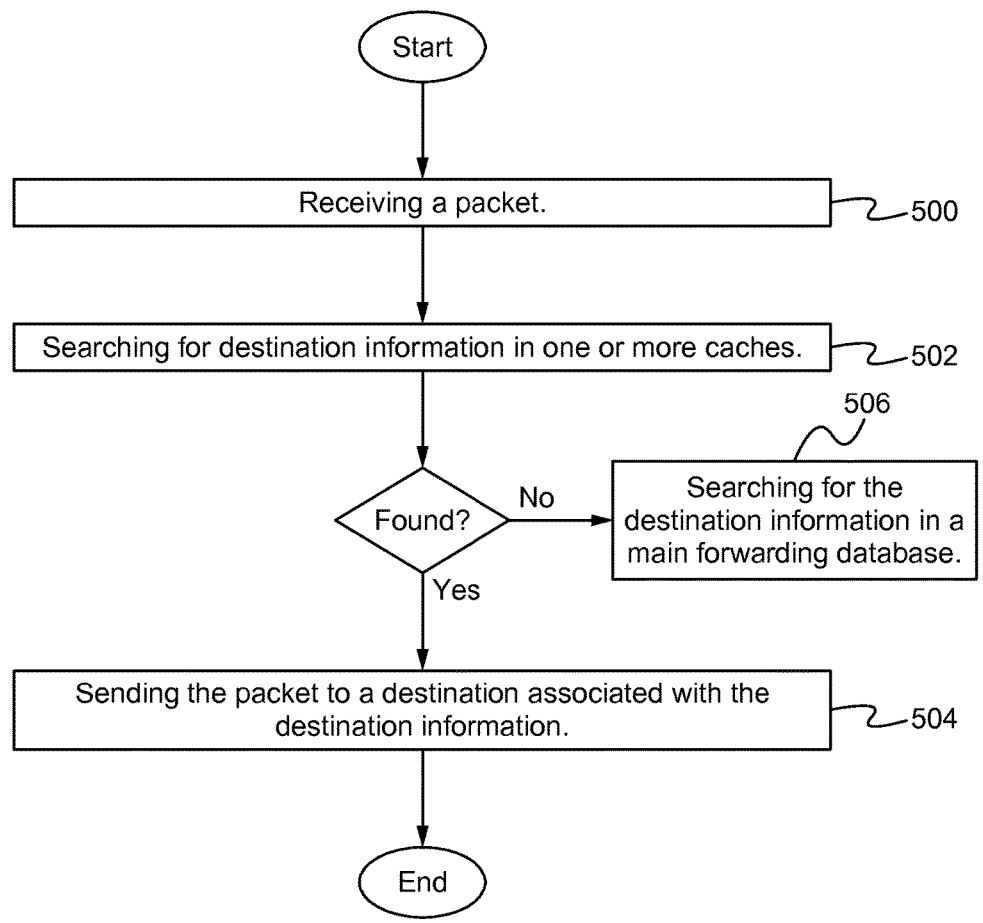
FIG. 5 illustrates a flowchart of implementing forwarding database cache according to some embodiments.

FIG. 5 illustrates a flowchart of implementing forwarding database cache according to some embodiments. In the step 500, a data packet is received by a device. The data packet includes destination information (e.g., which interface the packet is supposed to go to). In some embodiments, the packet is processed by a packet processing element. In the step 502, one or more of the caches are searched for the destination information. The caches contain a forwarding database or table. If the destination information is found in the cache, then the packet is sent to the destination (e.g., port/flow/interface/"virtual interface" such as a LAG, ECMP or tunnel interface) associated with the destination information, in the step 504. If the destination information is not found in the cache, then a main forwarding database is searched, in the step 506. When the information is found in the main forwarding database, the packet is sent to the destination associated with the destination information, in the step 504. In some embodiments, the packet is modified before or during forwarding the packet to the destination (e.g., a packet format/content is modified to be properly received at the destination). In some embodiments, the information searched for is a destination address, and in some embodiments, information other than the destination address is searched for. In some embodiments, fewer or additional steps are implemented. In some embodiments, the order of the steps is modified.

Figure 6:
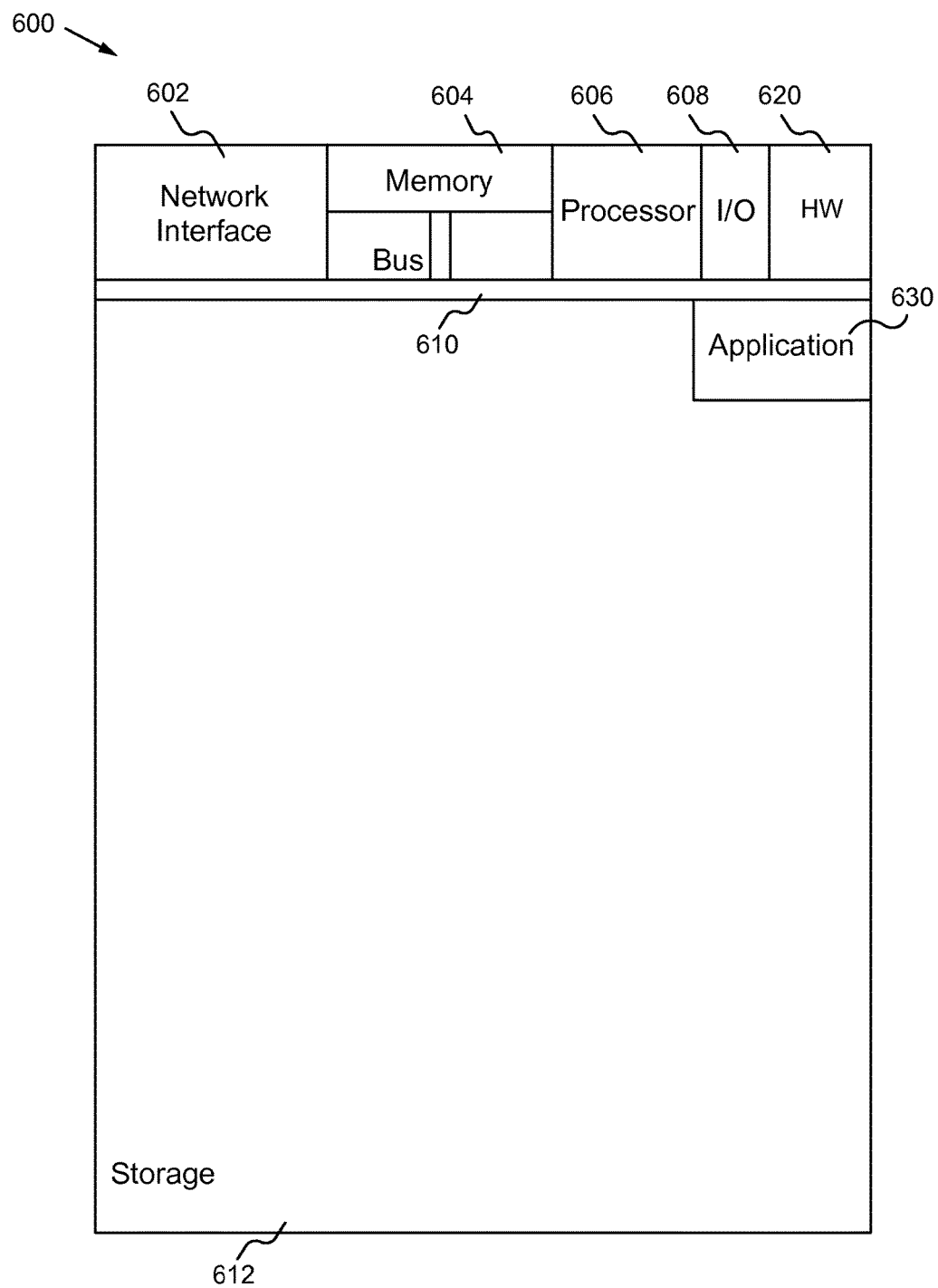
FIG. 6 illustrates a block diagram of an exemplary computing device configured to implement the forwarding database cache method according to some embodiments.

FIG. 6 illustrates a block diagram of an exemplary computing device configured to implement the forwarding database cache method according to some embodiments. A computing device 600 is able to be used to acquire, store, compute, process, communicate, receive, send, and/or display information such as data packets. In general, a hardware structure suitable for implementing the computing device 600 includes a network interface 602, a memory 604, a processor 606, I/O device(s) 608, a bus 610 and a storage device 612. The choice of processor(s) is not critical as long as suitable processor(s) with sufficient speed are chosen. The memory 604 is able to be any conventional computer memory known in the art. The storage device 612 is able to include memory, a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network interface controller or a network card connected to an Ethernet or other type of Local Area Network (LAN). The I/O device(s) 608 are able to include one or more of the following: keyboard, mouse, monitor, screen, printer, modem, touchscreen, button interface and other devices. Forwarding database cache application(s) 630 used to perform the forwarding database cache method may be stored in the storage device 612 and memory 604 and processed as applications are typically processed. More or fewer components shown in FIG. 6 are able to be included in the computing device 600. In some embodiments, forwarding database cache hardware 620 is included. Although the computing device 600 in FIG. 6 includes applications 630 and hardware 620 for the forwarding database cache method, the forwarding database cache method is able to be implemented on a computing device in hardware, firmware, software or any combination thereof. For example, in some embodiments, the forwarding database cache applications 630 are programmed in a memory and executed using a processor. In another example, in some embodiments, the forwarding database cache hardware 620 is programmed hardware logic including gates specifically designed to implement the forwarding database cache method.

In some embodiments, forwarding database cache application(s) 630 include several applications and/or modules. In some embodiments, modules include one or more sub-modules as well. In some embodiments, fewer or additional modules are able to be included.

Examples of suitable computing devices include a server, a personal computer, a laptop, a mobile device (e.g., smart phone), a network switch, a router, a hub, any other networking equipment and any other computing devices.

To utilize the forwarding database cache, a switch or other device is configured to implement the forwarding database cache including a main forwarding database and one or more forwarding database caches. When a packet is received, the cache is searched first for information such as address information, and if found, then the packet is forwarded to the appropriate destination. If the address information is not found in the cache, then the main forwarding database is searched, and the packet is forwarded to the appropriate destination based on the information in the main forwarding database.

In operation, the performance and the size of the database is balanced by the forwarding database cache. There could be billions of searches per second, and the rates are going to keep going up. Improving performance is a goal but it also important to enable scaling (e.g., allow the size of the database to grow). There are also physical constraints to be dealt with (e.g., the size of the die). The forwarding database cache disaggregates congestion. Localization of the data helps alleviate some of the congestion issues.

Totally distributed/localized memory architectures have limitations in forwarding data based scaling. Hybrid forwarding cache architecture is able to help mitigate (if not solve) many of these issues. As described, any caching scheme is able to be implemented, such as caching most recent or most heavily used entries in level 1 cache, and the cache is flushed on dirty or write from level 2 main memory.

By implementing the forwarding database cache, most recent forwarding entries are localized in level 1 cache local to the packet processing engines. Searches are performed at high rates in the level 1 cache. If a miss occurs, then a search is performed on the main level 2 memory. A read occurs as write-through with varying replacement strategies. Level 2 memory read is a greater latency, but this may be reduced with speculative reads. Other level 1 memories check for dirty entries and mark them invalid.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

I claim:

1. A method comprising:
receiving a packet containing information at a network switch;
searching a cache on the network switch containing a first set of searchable information for a match of the information;
if the match of the information is not found in the cache, then searching a memory on the network switch containing a second set of searchable information for the information;
sending the packet to a destination based on the match of the information, wherein the cache and the memory are in separate physical memories that are both within the network switch and are discontinuous with each other, wherein at least a portion of the first set of searchable information is speculatively sent from the memory to the cache independent of a search of the memory matching the portion, wherein the portion forms one or more speculative entries within the cache; and
deleting one or more of the speculative entries of the cache in response to the match of the information being found within the cache.

2. The method of claim 1 wherein the first set of searchable information is stored in a first forwarding database in the cache, and the second set of searchable information is stored in a second forwarding database in the memory.

3. The method of claim 1 wherein the first set of searchable information is stored in a plurality of first forwarding databases in the cache, and the second set of searchable information is stored in a second forwarding database in the memory.

4. The method of claim 1 wherein the cache includes a plurality of first physical memories and the memory is a separate physical memory.

5. The method of claim 1 wherein the destination includes a virtual interface or a port.

6. The method of claim 1 wherein the first set of searchable information within the cache contains less searchable information than the second set of searchable information within the memory, further wherein the first set of searchable information is able to retrieve searchable information from the second set of searchable information.

7. The method of claim 1 wherein the information comprises address information.

8. A system comprising:
a packet processing element of a network switch configured for processing a packet including information;
a main memory of the network switch configured for storing searchable information to search for the information; and
a cache memory of the network switch configured for storing a subset of the searchable information less than the entire searchable information to search for the information, wherein the cache memory and the main memory are in separate physical memories that are both within the network switch and are discontinuous with each other, wherein at least a portion of the searchable information is speculatively sent from the main memory to the cache memory independent of a search of the main memory matching the portion, wherein the portion forms one or more speculative entries within the cache, and further wherein one or more of the speculative entries of the cache are deleted in response to the match of the information being found within the cache.

9. The system of claim 8 wherein the searchable information is stored in a first forwarding database in the cache memory and a second forwarding database in the main memory.

10. The system of claim 8 wherein the searchable information is stored in a plurality of first forwarding databases in the cache memory and a second forwarding database in the main memory.

11. The system of claim 8 wherein the cache memory includes a plurality of first physical memories and the main memory is a separate physical memory.

12. The system of claim 8 wherein processing the packet includes forwarding the packet to a destination including a virtual interface or a port.

13. The system of claim 8 wherein the information comprises address information.

14. A network switch comprising:
a memory for storing an application, the application configured for:
receiving a packet containing information;
searching a cache containing a first set of searchable information for a match of the information;

if the match of the information is not found in the cache, then searching a memory containing a second set of searchable information for the information; and sending the packet to a destination based on the match of the information; and a processing component coupled to the memory, the processing component configured for processing the application, wherein the cache and the memory are in separate physical memories that are both within the network switch and are discontinuous with each other, wherein at least a portion of the first set of searchable information is speculatively sent from the memory to the cache independent of a search of the memory matching the portion, wherein the portion forms one or more speculative entries within the cache, and further wherein one or more of the speculative entries of the cache are deleted in response to the match of the information being found within the cache.

15. The network switch of claim 14 wherein the first set of searchable information is stored in a first forwarding database in the cache, and the second set of searchable information is stored in a second forwarding database in the memory.

16. The network switch of claim 14 wherein the first set of searchable information is stored in a plurality of first forwarding databases in the cache, and the second set of searchable information is stored in a second forwarding database in the memory.

17. The network switch of claim 14 wherein the cache includes a plurality of first physical memories and the memory is a separate physical memory.

18. The network switch of claim 14 wherein the destination includes a virtual interface or a port.

19. The network switch of claim 14 wherein the first set of searchable information within the cache contains less searchable information than the second set of searchable information within the memory, further wherein the first set of searchable information is able to retrieve searchable information from the second set of searchable information.

20. The network switch of claim 14 wherein the information comprises address information.

21. The method of claim 2 wherein the first forwarding database and the second forwarding database operate independent of each other.

22. The system of claim 9 wherein the first forwarding database and the second forwarding database operate independent of each other.

23. The network switch of claim 15 wherein the first forwarding database and the second forwarding database operate independent of each other.

24. The method of claim 2 wherein the first and second forwarding databases include tags associated with the first and second sets of searchable information so that if there are conflicting tags, the cache is able to be flushed of the information associated with the conflicting tags.

25. The system of claim 9 wherein the first and second forwarding databases include tags associated with the first and second sets of searchable information so that if there are conflicting tags, the cache memory is able to be flushed of the information associated with the conflicting tags.

26. The network switch of claim 15 wherein the first and second forwarding databases include tags associated with the first and second sets of searchable information so that if there are conflicting tags, the cache is able to be flushed of the information associated with the conflicting tags.

* * * * *